(12) United States Patent
Maloo

(10) Patent No.: US 9,560,125 B2
(45) Date of Patent: *Jan. 31, 2017

(54) SYSTEM AND METHOD FOR SEGREGATING LAYER SEVEN CONTROL AND DATA TRAFFIC

(71) Applicant: AT&T Intellectual Property I, L.P., Atlanta, GA (US)

(72) Inventor: Sunil Maloo, Edison, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,069

(22) Filed: Feb. 10, 2016

(65) Prior Publication Data
US 2016/0164965 A1    Jun. 9, 2016

Related U.S. Application Data

(63) Continuation of application No. 14/686,132, filed on Apr. 14, 2015, now Pat. No. 9,288,282, which is a continuation of application No. 13/537,998, filed on Jun. 29, 2012, now Pat. No. 9,015,233.

(51) Int. Cl.
*G06F 15/16* (2006.01)
*H04L 29/08* (2006.01)

(52) U.S. Cl.
CPC ......... *H04L 67/1014* (2013.01); *H04L 67/101* (2013.01); *H04L 67/1095* (2013.01); *H04L 67/2814* (2013.01); *H04L 67/2842* (2013.01); *H04L 67/2852* (2013.01); *H04L 67/2857* (2013.01)

(58) Field of Classification Search
CPC ............. H04L 67/2857; H04L 67/2814; H04L 67/1095

See application file for complete search history.

(56) References Cited

U.S. PATENT DOCUMENTS

| | | | |
|---|---|---|---|
| 7,093,279 B2 | 8/2006 | Tretheway et al. | |
| 7,296,076 B1 | 11/2007 | Portolani | |
| 7,333,990 B1 | 2/2008 | Thiagarajan et al. | |
| 7,809,840 B2 | 10/2010 | Jing et al. | |
| 7,954,144 B1 | 5/2011 | Ebrahimi et al. | |
| 8,073,952 B2 | 12/2011 | Yoo et al. | |
| 8,140,690 B2 | 3/2012 | Ly et al. | |
| 9,015,233 B2 * | 4/2015 | Maloo | H04L 67/2842 709/203 |
| 9,288,282 B2 * | 3/2016 | Maloo | H04L 67/2842 |
| 2005/0044242 A1 | 2/2005 | Stevens et al. | |
| 2007/0136477 A1 | 6/2007 | Bryce et al. | |

(Continued)

*Primary Examiner* — Yves Dalencourt
(74) *Attorney, Agent, or Firm* — Akerman LLP; Michael K. Dixon; Mammen (Roy) P. Zachariah, Jr.

(57) ABSTRACT

A load balancer forwards a content request from a client system to a proxy server, receives from the proxy server a modified content request based on the content request and including information identifying a content origin server, opens a connection with the content origin server in response to receiving the first modified content request, and sends a second modified content request based upon the first modified content request to the content origin server. The load balancer also receives content associated with the content request from the content origin server, and forwards the content to the client system.

20 Claims, 7 Drawing Sheets

(56) References Cited

U.S. PATENT DOCUMENTS

2008/0025230 A1 1/2008 Patel et al.
2012/0089700 A1 4/2012 Safruti et al.
2012/0117253 A1 5/2012 Scoda

* cited by examiner

SYSTEM AND METHOD FOR SEGREGATING LAYER SEVEN CONTROL AND DATA TRAFFIC

CROSS-REFERENCE TO RELATED APPLICATION(S)

This application claims priority to and is a continuation of U.S. patent application Ser. No. 14/686,132, filed on Apr. 14, 2015, which is a continuation of U.S. patent application Ser. No. 13/537,998, filed on Jun. 29, 2012, now U.S. Pat. No. 9,015,233, both of which are hereby incorporated by reference in their entireties.

FIELD OF THE DISCLOSURE

The present disclosure generally relates to communications networks, and more particularly relates to a system and method for segregating layer-7 control and data traffic.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks. An alternative to the CDN is transparent caching/proxy which does not require a business relationship between the network provider and the content owner. A transparent cache server can be a pure proxy where no content is cached, or can be a caching proxy where the content is cached. The CDN caches are also referred to as reverse proxies.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
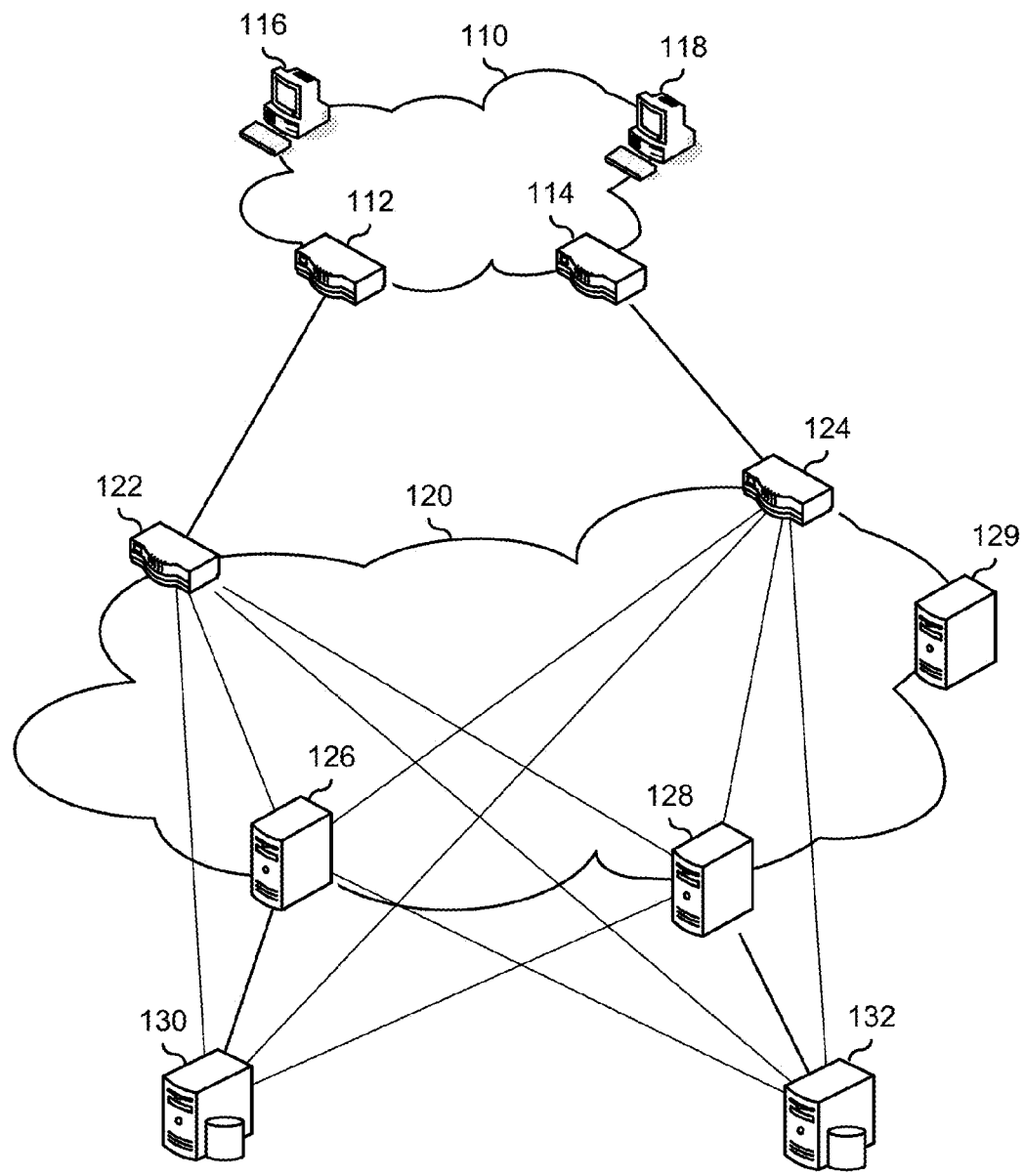
FIG. 1 is a block diagram illustrating a communications network in accordance with an embodiment of the present disclosure.

FIG. 1 illustrates a communications network 100, such as the Internet, including an autonomous system (AS) 110, a provider network 120, and content origin servers 130 and 132. AS 110 includes routers 112 and 114, and client systems 116 and 118. Provider network 120 includes load balancers 122 and 124, proxy servers 126 and 128, and a cache server 129. Routers 112 and 114 communicate with each other and connect to other ASs through peering points at the routers. Client systems 116 and 118 are connected to one or more of routers 112 and 114 and to provider network 120 to retrieve information from provider network 120 and from content origin servers 130 and 132. For example, cache server 129 can include a web page, a content file, such as graphic, audio, and video content, a program file such as a software update, or the like, that client system 116 can retrieve from the cache server, and content origin server 130 can include another web page, download content file, program file, or the like, that client system 118 can retrieve from the content origin server.

In a particular embodiment, when cache server 129 includes content that is requested by client system 116 and 118, the requests are directed to one of load balancers 122 or 124. For example, a request can include layer-7 control traffic such as a HyperText Transport Protocol (HTTP) connection request that is received by load balancers 122 and 124, and a connection can be opened between the requesting client system 116 or 118 and the receiving load balancer. An example of an HTTP connection request includes a requesting client system 116 or 118 issuing a TCP synchronization request (SYN), the receiving load balancer 122 or 124 responding with a synchronization acknowledge response (SYN/ACK) to the requester, and the requester responding with an acknowledge response (ACK). Collectively, an HTTP connection request can be referred to as a SYN-SYN/ACK-ACK transaction. In turn, load balancers 122 and 124 issue an HTTP connection request to one of proxy servers 126 or 128 and a connection is opened between the requesting load balancer and the receiving proxy server. Once a connection is opened the client sends an HTTP request such as a GET message. The receiving proxy server 126 or 128 determines if the content is available from cache server 129, and if so, directs the cache server to provide the requested data to the requesting client system 116 or 118.

In another embodiment, when the content is not available from cache server 129, the receiving proxy server 126 or 128 will issue an HTTP connection request to content origin server 130 or 132 that is designated as the content origin server for the requested content and a connection is opened between the requesting proxy server and the receiving content origin server. When the connections are opened, the requesting client system issues further layer-7 control traffic, such as an HTTP content request, to the connected load balancer which forwards the HTTP content request to the connected proxy server, and the proxy server forwards the HTTP content request to the connected content origin server. An example of an HTTP content request includes an HTTP GET request, an HTTP POST request, another HTTP content request, or a combination thereof. In response to receiving the HTTP content request, the content origin server issues layer-7 data traffic to provide the requested content back to the requesting client system via the connected proxy server and the connected load balancer. In a particular embodiment, the connections between AS 110 and load balancers 122 and 124, between the load balancers and proxy servers 126 and 128, and between the proxy servers and content origin servers 130 and 132 are closed after the requested content is sent to the requesting client system 116 or 118. As such, the connections between one or more of AS 110, load balancers 122 and 124, proxy servers 126 and 128, and content origin servers 130 and 132 are maintained only until the requested content is delivered to client system 116 or 118. In another embodiment, the connections between one or more of AS 110, load balancers 122 and 124, proxy servers 126 and 128, and content origin servers 130 and 132 are persistent connections, as needed or desired. For example, because the connections between load balancers 122 and 124 and proxy servers 126 and 128 are within provider network 120, the connections can be maintained to handle multiple HTTP content requests. Content origin servers 130 and 132 can represent an actual origin server, or can represent another intermediate server acting as a content origin server, such as a content transformation server or the like.

Figure 2:
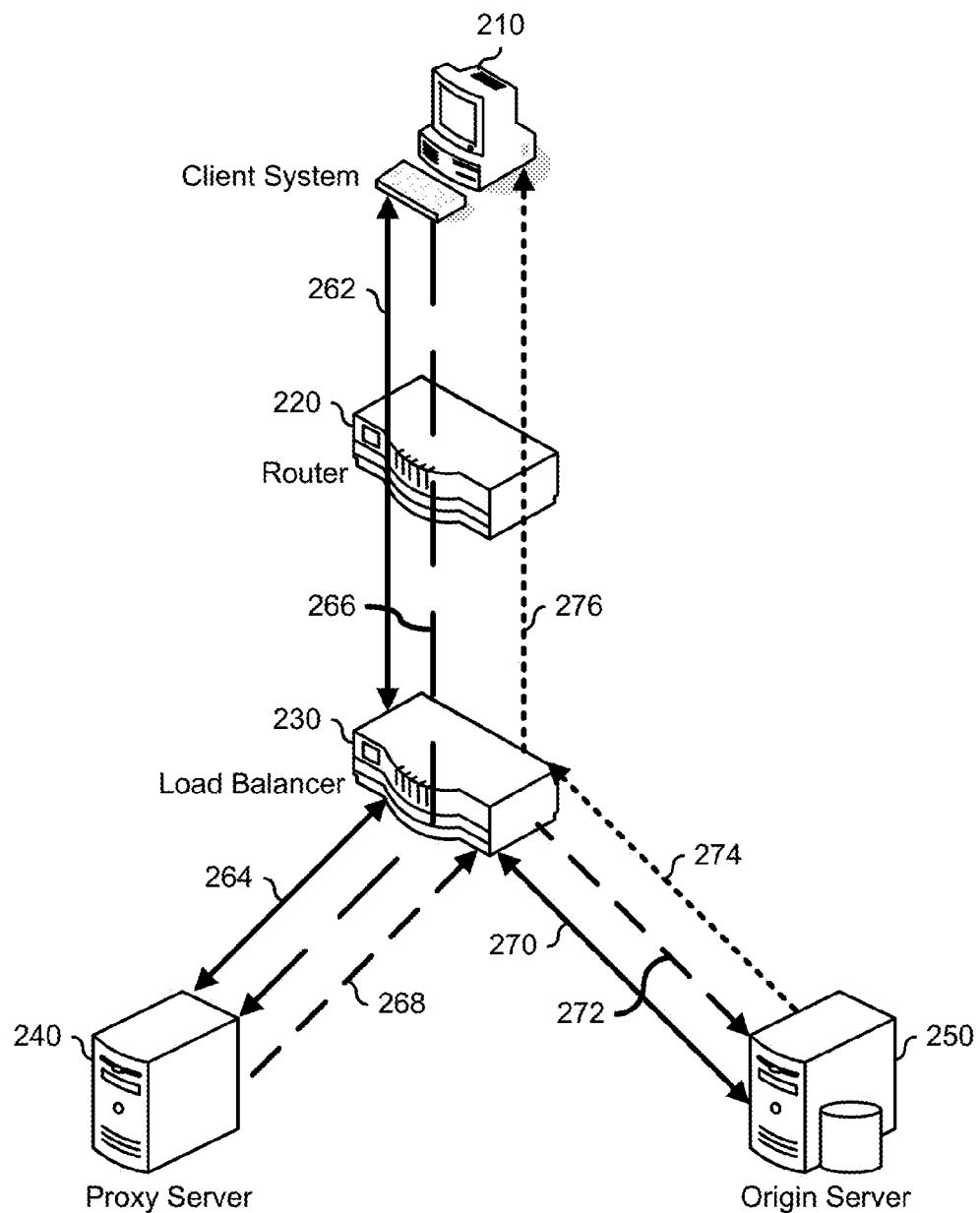
FIG. 2 is a block diagram illustrating a communications network in accordance with another embodiment of the present disclosure.

FIG. 2 illustrates another embodiment of a communications network 200, similar to communications network 100, including a client system 210, a router 220, a load balancer 230, a proxy server 240, and a content origin server 250. Client system 210 can request content by issuing layer-7 control traffic such as an HTTP connection request 262. The connection can terminate on load balancer 230 which in-turn issues an HTTP connection request 264 to proxy server 240 and a connection is opened between the load balancer and the proxy server and forwards the client request to proxy server 240. Proxy server 240 determines that the requested content is not available from a cache server, and sends a modified HTTP content request 268 to load balancer 230. In response to modified HTTP content request 268, load balancer 230 issues an HTTP connection request 270 to content origin server 250 to open a connection between the load balancer and the content origin server. Load balancer 230 then issues modified HTTP content request 272 to content origin server 250.

Content origin server 250 operates to provide layer-7 data traffic including the requested content 274 to load balancer 230 over the open connection between the load balancer and the content origin server. Load balancer 230 forwards the requested content 276 to client system 210 over the open connection between the client system and the load balancer. In this way, the layer-7 control traffic is segregated from the layer-7 data traffic, such that proxy server 240 is not burdened with the load of the layer-7 data traffic. As such, proxy server 240 can be sized based upon the bandwidth needed to accommodate HTTP connection request 264, HTTP content request 266, and modified HTTP content request 268, and is relieved of handling the network load associated with providing the requested content 274 to the client. In a particular embodiment, the connections between client system 210 and load balancer 230, between the load balancers and proxy server 240, and between the load balancer and content origin server 250 are closed after the requested content 276 is provided to client system 210. In another embodiment, the connections between one or more of client system 210 and load balancer 230, the load balancers and proxy server 240, and the load balancer and content origin server 250 are persistent connections, as needed or desired.

Proxy server 240 modifies HTTP content request 266 into modified HTTP content request 268 by adding HTTP headers to the HTTP content request, removing HTTP headers from the HTTP content request, or modifying HTTP headers in the HTTP content request, as needed or desired. For example, proxy server 240 can add, remove, or modify HTTP headers such as content type headers, authorization headers, mime type headers, date headers, referrer headers, user agent headers, other HTTP headers, non-standard headers, or a combination thereof. As such, modified HTTP content request 268 can uniquely identify a user of client system 210, or can communicate additional information to origin server 250, such as network connectivity or device characteristics of the client system. In a particular embodiment, proxy server 240 determines a quality of service (QoS) level associated with HTTP content request 266, and adds or modifies a Differentiated Service Code Point (DSCP) header to reflect the QoS level. In another embodiment, proxy server 240 provides a forwarding Internet Protocol (IP) address in the place of a destination address of HTTP content request 266, where the forwarding IP address is associated with one of several origin servers 250, or can provide a keyword associated with the one of several origin servers.

Proxy server 240 also operates to respond to HTTP content request 266 with a Universal Resource Indicator (URI) redirect message, such as an HTTP 302 message, to client system 210. For example, proxy server 240 can be operated in conjunction with a parental control capability, and can determine that the requested content is associated with a content restriction for a particular user of client system 210. Here, proxy server 240 can provide a URI redirect that redirects client system 210 to a web page that indicates that the requested content is restricted. In addition, proxy server 240 can respond to a request for restricted content by sending a URI redirect message that includes a keyword, such as "RESET," to load balancer 230, thereby instructing the load balancer to send a Transmission Control Protocol (TCP) Reset (RST) message back to client system 210, thereby resetting the connection between the client system and the load balancer. In another embodiment, modification of HTTP content request 266 is based upon pre-configured policies associated with particular IP addresses and headers and HTTP headers, and the modification can be performed in conjunction with a policy server for the provider network. In a particular embodiment, proxy server 240 operates to log the received HTTP content requests 226, the issued modified HTTP content requests 228, and the modifications made. Proxy server 240 further operates to detect non-HTTP traffic that is issued over TCP port 80, and to return the non-HTTP traffic to load balancer 230 unmodified, or to otherwise handle the non-HTTP traffic.

Load balancer 230 operates to receive the modified HTTP content request 268. Based upon the modifications included in the HTTP headers, load balancer 230 operates to issue HTTP connection request 270 to content origin server 250 to open the connection between the origin server and the load balancer. When the connection is open, load balancer 230 issues modified HTTP content request 272 to content origin server 250. In a particular embodiment, modified HTTP content request 272 is the same as HTTP content request 268. In another embodiment, modified HTTP content request 272 is different than modified HTTP content request 268, and load balancer 230 operates to modify modified HTTP content request 268 into modified HTTP content request 272. In particular, where proxy server 240 adds or modifies a DSCP header, load balancer 230 operates to handle modified HTTP content request 268 according to the indicated QoS level. Further, where proxy server 240 provides a forwarding IP address or keyword associated with origin server 250, load balancer 230 operates to remove the IP address or keyword, as needed or desired.

Figure 3:
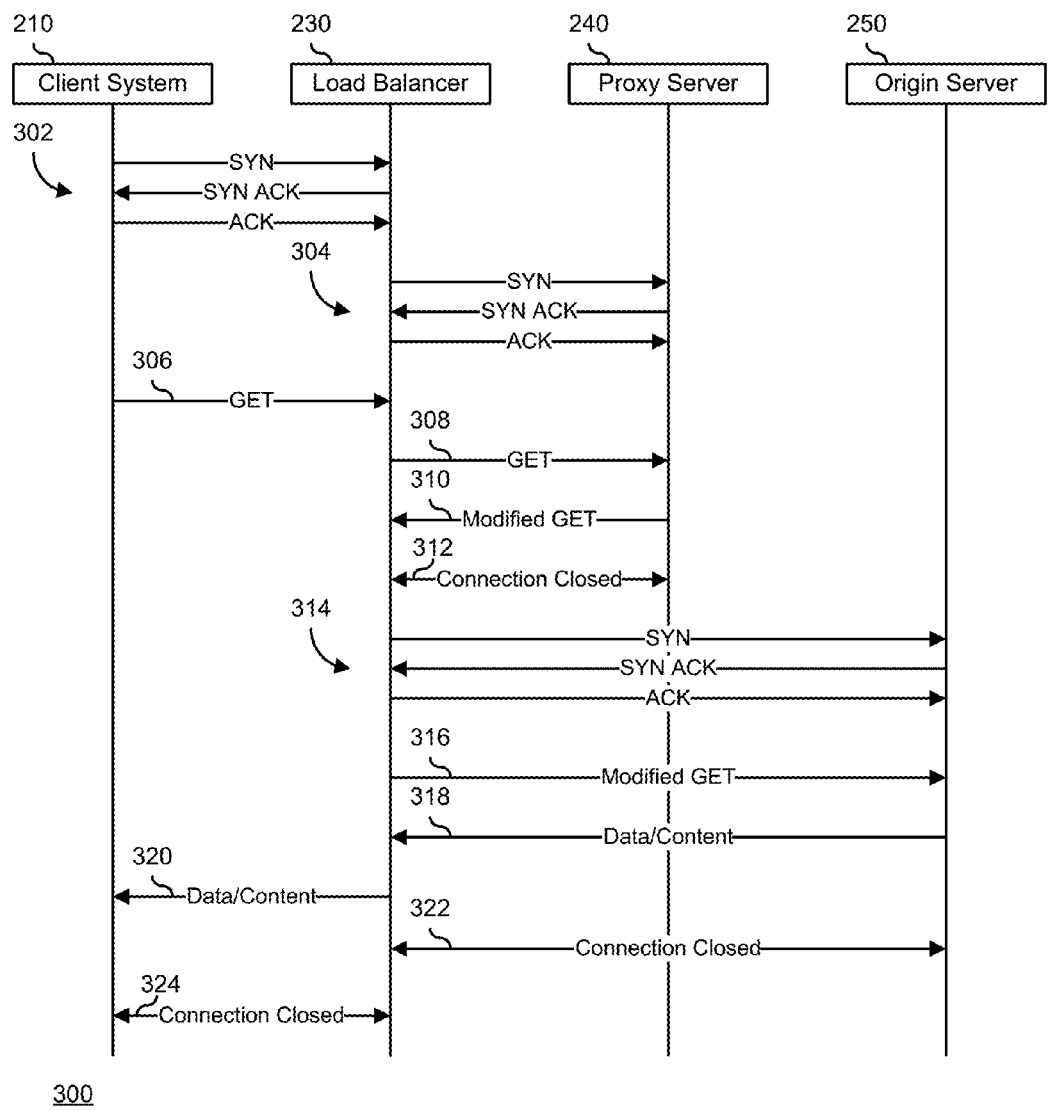
FIGS. 3-6 are lane/flow diagrams illustrating various use cases of the communications network of FIG. 2.

FIGS. 3-6 illustrate various use cases of communications network 200. FIG. 3 shows a case 300 where connections between client system 210, load balancer 230, proxy server 240, and origin server 250 are closed after the requested content is sent to the client system. Here client system 210 sends a TCP connection request to load balancer 230, depicted as a SYN-SYN/ACK-ACK transaction 302, thereby opening a connection between the client system and the load balancer. Load balancer 230 sends a TCP connection request to proxy server 240, depicted as a SYN-SYN/ACK-ACK transaction 304, thereby opening a connection between the load balancer and the proxy server. Client system 210 sends an HTTP content request, depicted as a GET request 306 to load balancer 230, and the load balancer forwards GET request 308 to proxy server 240. Proxy server 240 returns a modified GET request 310 to load balancer 230, and the connection between the load balancer and the proxy server is closed 312. Load balancer 230 sends a TCP connection request to origin server 250, depicted as a SYN-SYN/ACK-ACK transaction 314, thereby opening a connection between the load balancer and the origin server. Load balancer 230 sends the modified GET request 316 to origin server 250. Origin server 250 sends the requested content 318 to load balancer 230, and the load balancer forwards the requested content 320 to client system 210. The connection between load balancer 230 and origin server 250 is closed 322, and the connection between the load balancer and client system 210 is closed 324.

Figure 4:
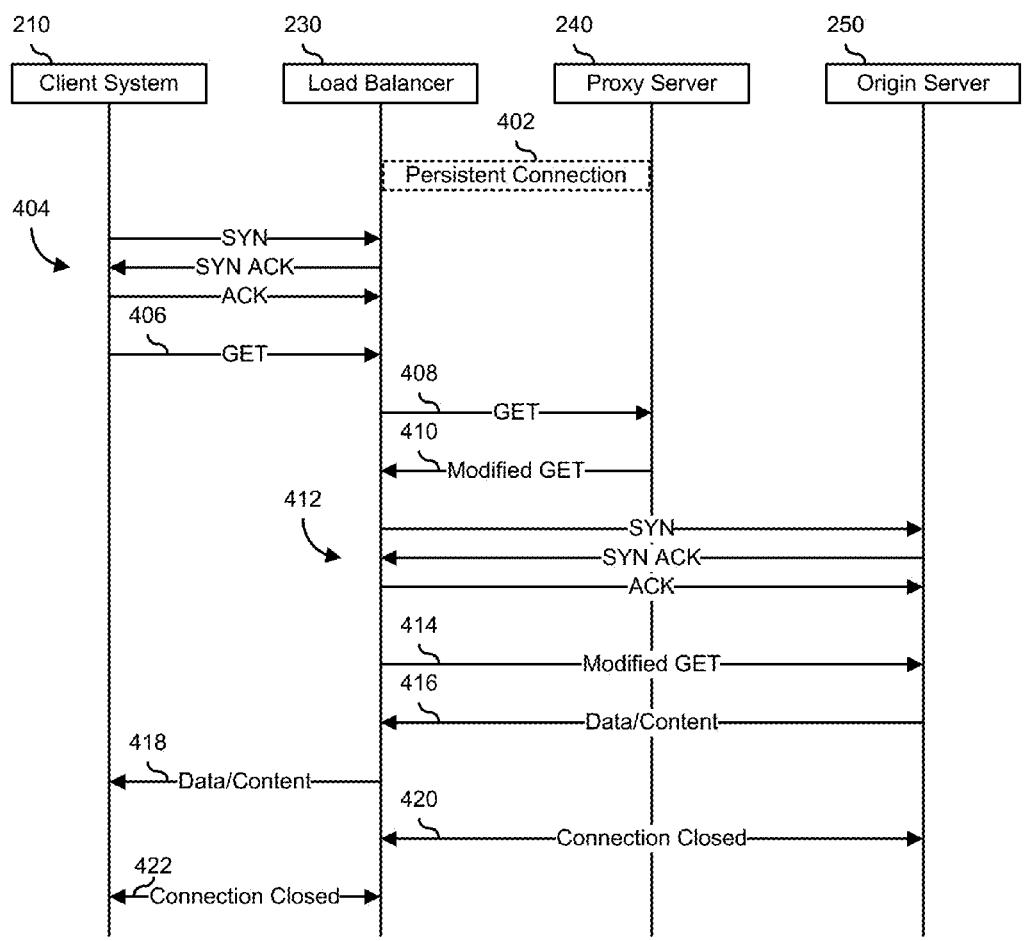

FIG. 4 shows a case 400 where the connection between load balancer 230 and proxy server 240 is a persistent connection 402, and the connection between client system 210 and load balancer 230 is closed after the requested content is sent to the client system. Here client system 210 sends a SYN-SYN/ACK-ACK transaction 404, thereby opening a connection between the client system and the load balancer, and sends a GET request 406 to the load balancer. Load balancer 230 forwards GET request 408 to proxy server 240, and the proxy server returns a modified GET request 410 to the load balancer. Load balancer 230 sends a SYN-SYN/ACK-ACK transaction 412 to origin server 250, thereby opening a connection between the load balancer and the origin server. Load balancer 230 sends the modified GET request 414 to origin server 250. Origin server 250 sends the requested content 416 to load balancer 230, and the load balancer forwards the requested content 418 to client system 210. The connection between load balancer 230 and origin server 250 is closed 420, and the connection between the load balancer and client system 210 is closed 422.

Figure 5:
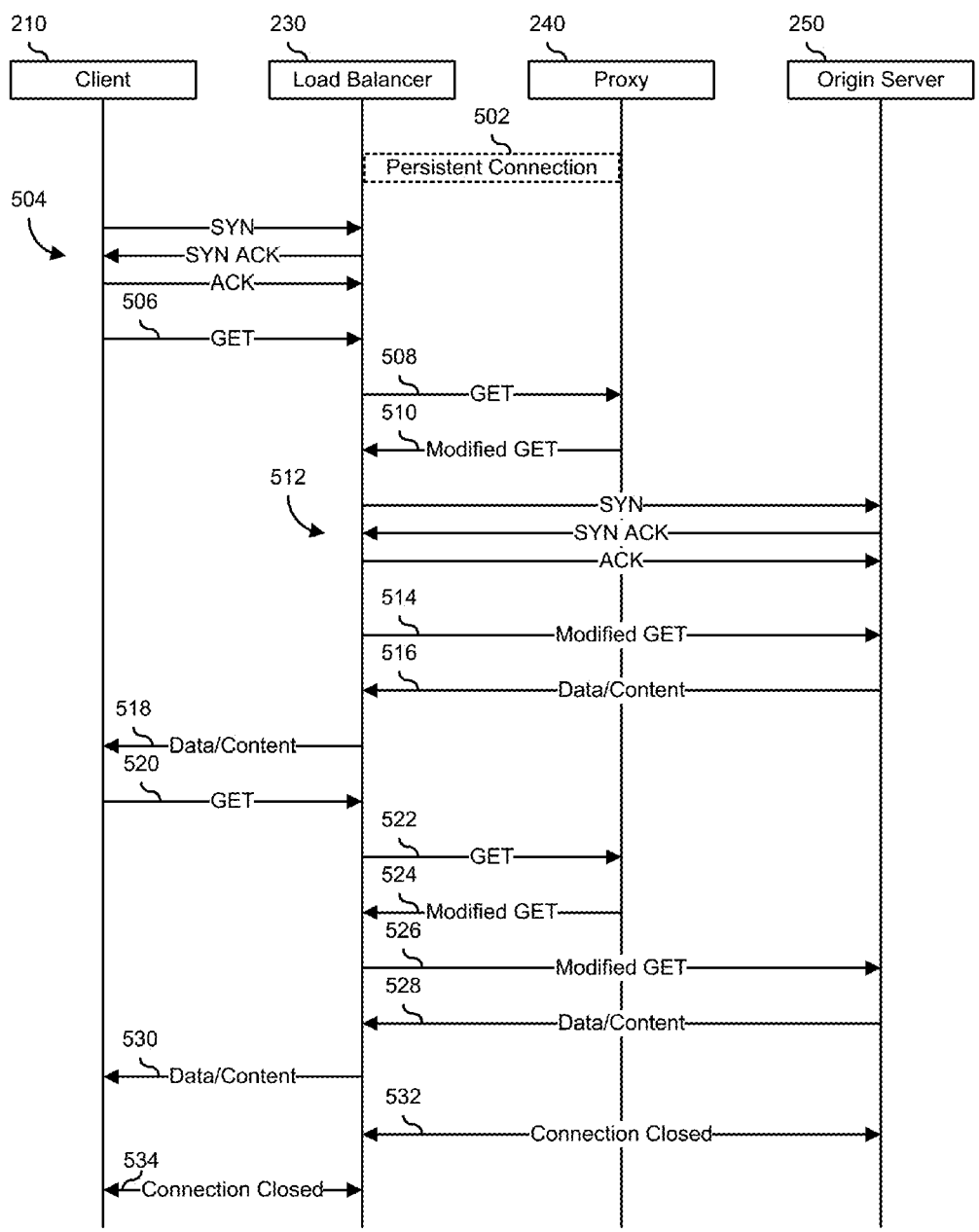

FIG. 5 shows a case 500 where the connection between load balancer 230 and proxy server 240 is a persistent connection 502, and the connection between client system 210 and load balancer 230 remains open for multiple content requests. Here client system 210 sends a SYN-SYN/ACK-ACK transaction 504, thereby opening a connection between the client system and the load balancer, and sends a GET request 506 to the load balancer. Load balancer 230 forwards GET request 508 to proxy server 240, and the proxy server returns a modified GET request 510 to the load balancer. Load balancer 230 sends a SYN-SYN/ACK-ACK transaction 512 to origin server 250, thereby opening a connection between the load balancer and the origin server. Load balancer 230 sends the modified GET request 514 to origin server 250. Origin server 250 sends the requested content 516 to load balancer 230, and the load balancer forwards the requested content 518 to client system 210. Client system 210 sends another GET request 520 to load balancer 230, and the load balancer forwards GET request 522 to proxy server 240. Proxy server 240 returns another modified GET request 524 to load balancer 230, and the load balancer sends the modified GET request 526 to origin server 250. Origin server 250 sends the requested content 528 to load balancer 230, and load balancer 230 forwards the requested content 530 to client system 210. The connection between load balancer 230 and origin server 250 is closed 532, and the connection between the load balancer and client system 210 is closed 534.

Figure 6:
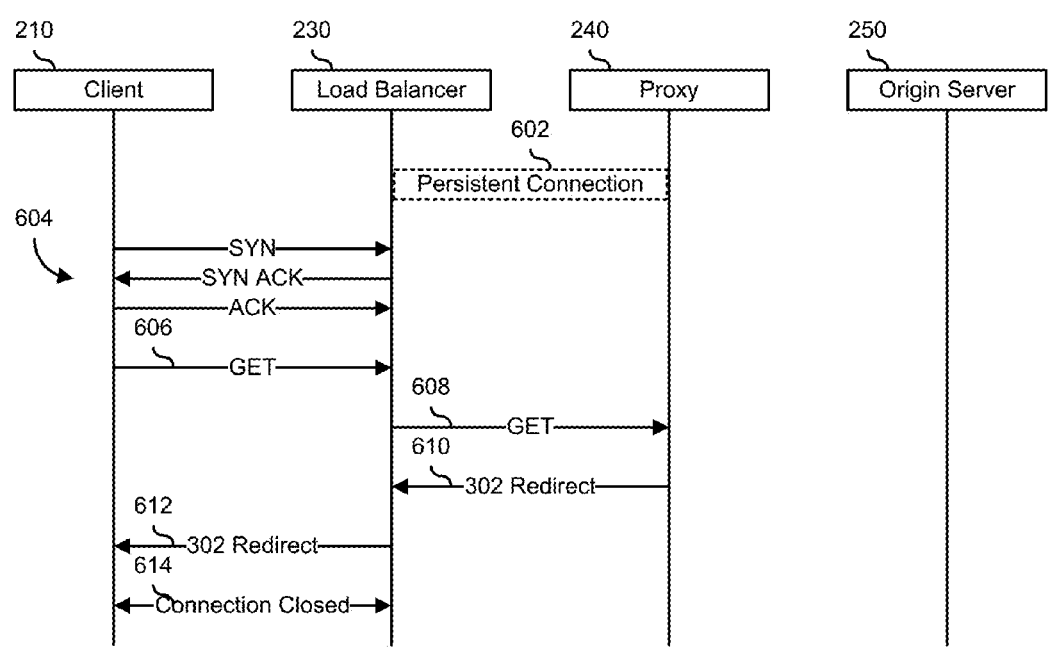

FIG. 6 shows a case 600 where proxy server 240 issues a redirect in response to a content request. Here the connection between load balancer 230 and proxy server 240 is a persistent connection 602, and client system 210 sends a SYN-SYN/ACK-ACK transaction 604, thereby opening a connection between the client system and the load balancer. Client system 210 sends a GET request 606 to load balancer 230, and the load balancer forwards GET request 608 to proxy server 240. Proxy server 240 returns a redirect response 610 to load balancer 230, the load balancer forwards the redirect response 612 to client system 210, and the connection between the load balancer and the client system is closed 614.

Figure 7:
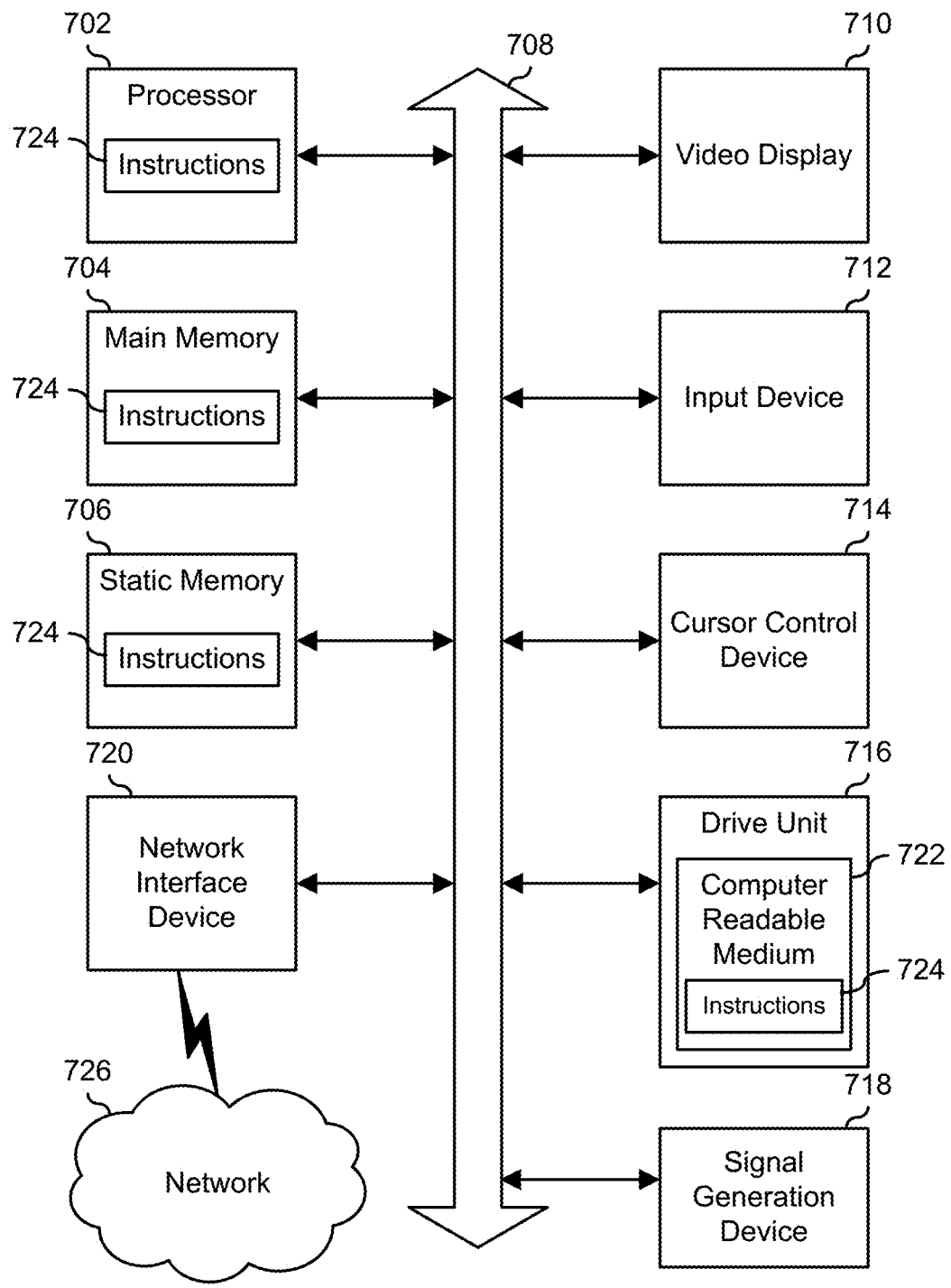
FIG. 7 is an illustrative embodiment of a general computer system.

FIG. 7 illustrates an embodiment of a general computer system 700. The computer system 700 includes instructions that are executed to cause the computer system to perform any one or more of the methods or computer based functions disclosed herein. Computer system 700 may operate as a standalone device or may be connected, such as by using a network, to other computer systems or peripheral devices. Computer system 700 can operate as a server or as a client user computer in a server-client user network environment, or as a peer computer system in a peer-to-peer (or distributed) network environment. Computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing instructions (sequential or otherwise) that specify actions to be taken by that machine. In a particular embodiment, computer system 700 can be implemented using electronic devices that provide voice, video, or data communication. Further, while computer system 700 is illustrated as a single item, the term "system" shall also be taken to include any collection of systems or sub-systems that individually or jointly execute a set of, or multiple sets of instructions to perform one or more computer functions.

Computer system 700 includes a processor 702, a main memory 704, a static memory 706, a video display unit 710, an input device 712, a cursor control device 714, a disk drive unit 716, a signal generation device 718, and a network interface device 720, that can communicate with each other via a bus 708. Processor 702 represents a central processing unit (CPU), a graphics processing unit (GPU), another processing device, or a combination thereof. Video display unit 710 represents a liquid crystal display (LCD), an organic light emitting diode (OLED), a flat panel display, a solid-state display, a cathode ray tube (CRT), another display device, or a combination thereof. In a particular embodiment, input device 712 represents a keyboard, and cursor control device 714 represents a mouse. Alternatively, input device 712 and cursor control device 714 can be combined with video display unit 710 in the form of a touchpad or touch sensitive screen. Disk drive device 716 represents an information storage device including a disk drive, a solid state drive (SSD), an external hard drive, another information storage device, or a combination thereof. Signal generation device 718 represents a speaker, a remote control unit, another device, or a combination thereof. Network interface device 720 communicates with a network 726. Disk drive device 716 includes a computer-readable medium 722 for storing one or more sets of instructions 724. Additionally, main memory 704 and static memory 706 store one or more additional sets of instructions 724. The sets of instructions 724 represent programs, software, firmware, machine-executable code, other instructions, or a combination thereof. Also, instructions 724 can be embedded in a device of computer system 700. In a particular embodiment, instructions 724 represent one or more of the methods or logic as described herein. Processor 702 operates to execute instructions 724 to perform one or more of the methods or logic as described herein.

The previously discussed modules, devices, systems, or other elements (hereinafter "module," can be implemented in hardware, software, or any combination thereof. Each module may include one or more computer systems. When a module includes more than one computer system, the functions of the module can be distributed across the multiple computer systems in a symmetric manner, i.e., each computer system performs the same type of tasks, or in an asymmetric manner, i.e., two computer systems of the module may perform different tasks.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
a memory that stores instructions;
a processor that executes the instructions to perform operations, the operations comprising:
receiving, from a proxy server, a message that includes a keyword to reset a first connection with a client system that sent a content request;
resetting, if the content request is associated with a content restriction, the first connection with the client system based on the keyword;
receiving, if the content request is not associated with the content restriction, a modified content request, wherein the modified content request includes information that identifies a content origin server;
receiving, via a second connection with the content origin server, the content from the content origin server; and
providing the content to the client system.

2. The system of claim 1, wherein the operations further comprise opening the second connection with the content origin server in response to receiving the modified content request.

3. The system of claim 1, wherein the operations further comprise terminating the second connection after providing the content to the client system.

4. The system of claim 1, wherein the operations further comprise receiving the content request from the client system.

5. The system of claim 1, wherein the operations further comprise forwarding the content request to the proxy server.

6. The system of claim 1, wherein the operations further comprise receiving a redirect message from the proxy server, wherein the redirect message is based on the content request.

7. The system of claim 6, wherein the operations further comprise forwarding the redirect message to the client system.

8. The system of claim 1, wherein the operations further comprise logging the content request.

9. The system of claim 1, wherein the operations further comprise determining if the content is available on a cache server.

10. The system of claim 9, wherein the operations further comprise providing, if the content is available on the cache server, the content to the client system without opening the second connection.

11. The system of claim 1, wherein the operations further comprise transmitting the modified content request to the content origin server so as to obtain the content.

12. The system of claim 1, wherein the operations further comprise removing a header from the content request.

13. The system of claim 1, wherein the operations further comprise determining a quality of service level associated with the content request.

14. A method, comprising:
- receiving, from a proxy server, a message that includes a keyword to reset a first connection with a client system that sent a content request;
- resetting, if the content request is associated with a content restriction, the first connection with the client system based on the keyword, wherein the first connection is reset by utilizing instructions from a memory that are executed by a processor;
- receiving, if the content request is not associated with the content restriction, a modified content request, wherein the modified content request includes information that identifies a content origin server;
- receiving, via a second connection with the content origin server, the content from the content origin server; and
- providing the content to the client system.

15. The method of claim 14, further comprising determining a quality of service level associated with the content request.

16. The method of claim 15, further comprising adding a header to the content request that indicates the quality of service level.

17. The method of claim 14, further comprising opening the second connection with the content origin server in response to receiving the modified content request.

18. The method of claim 14, further comprising identifying a user of the client system based on the content request.

19. The method of claim 14, further comprising terminating the second connection after providing the content to the client system.

20. A non-transitory computer-readable medium comprising instructions, which, when loaded and executed by a processor, cause the processor to perform operations, the operations comprising:
- receiving, from a proxy server, a message that includes a keyword to reset a first connection with a client system that sent a content request;
- resetting, if the content request is associated with a content restriction, the first connection with the client system based on the keyword;
- receiving, if the content request is not associated with the content restriction, a modified content request, wherein the modified content request includes information that identifies a content origin server;
- receiving, via a second connection with the content origin server, the content from the content origin server; and
- providing the content to the client system.

* * * * *